United States Patent
Hsu et al.

(10) Patent No.: US 11,118,591 B2
(45) Date of Patent: Sep. 14, 2021

(54) INTELLIGENT FAN WITH INTERFACE COMPATIBILITY

(71) Applicant: PROLIFIC TECHNOLOGY INC., Taipei (TW)

(72) Inventors: Chia Chang Hsu, Taipei (TW); Chih Feng Huang, Taipei (TW); Ching Te Chen, Taipei (TW); Ren Yuan Yu, Taipei (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 0 days.

(21) Appl. No.: 16/796,116

(22) Filed: Feb. 20, 2020

(65) Prior Publication Data
US 2020/0263696 A1  Aug. 20, 2020

(30) Foreign Application Priority Data
Feb. 20, 2019  (TW) .................................. 108105579

(51) Int. Cl.
*F04D 25/06* (2006.01)
*F04D 27/00* (2006.01)
*F04D 19/00* (2006.01)

(52) U.S. Cl.
CPC ......... *F04D 25/068* (2013.01); *F04D 19/002* (2013.01); *F04D 27/007* (2013.01)

(58) Field of Classification Search
USPC ........................................................ 700/300
See application file for complete search history.

(56) References Cited

U.S. PATENT DOCUMENTS

| | | | |
|---|---|---|---|
| 2008/0004755 A1* | 1/2008 | Dunstan | G06F 1/20 700/299 |
| 2015/0147155 A1* | 5/2015 | Duan | G05B 15/02 415/1 |
| 2020/0146179 A1* | 5/2020 | Zhan | G06F 1/20 |

* cited by examiner

*Primary Examiner* — Mohammad Ali
*Assistant Examiner* — Joshua T Sanders
(74) *Attorney, Agent, or Firm* — Muncy, Geissler, Olds & Lowe, P.C.

(57) ABSTRACT

An intelligent fan with interface compatibility is provided. The intelligent fan includes a fan body having a fan and a motor, a driving circuit, a tachometer, an output connector including a first pin, a second pin, a third pin and a fourth pin connected to a fan connector of a motherboard, and a microcontroller connected to the driving circuit and the tachometer, and connected to the motherboard via the first, second, third and fourth pins. When the intelligent fan is powered on, the microcontroller sets the third and fourth pins as input pins for receiving an output signal of the fan connector of the motherboard, and the microcontroller performs an I2C signal analysis on the output signal. When the I2C signal analysis succeeds, the intelligent fan is set in an I2C mode, and when the I2C signal analysis fails, the intelligent fan is set in a PWM mode.

12 Claims, 5 Drawing Sheets

INTELLIGENT FAN WITH INTERFACE COMPATIBILITY

BACKGROUND OF THE INVENTION

1. Field of the Invention

The present invention relates to a fan, and more particularly to an intelligent fan with interface compatibility.

2. Description of the Related Art

Generally, the conventional cooling fans can be classified into three-wire fans and four-wire fans. The four-wire fan has a pin defined as a PWM speed control pin. A control board on a motherboard can adjust a PWM duty cycle according to a detected temperature or system requirement, so as to control a fan speed, thereby achieving the purpose of adjusting the temperature.

The PWM duty cycle may be not linearly proportional to the fan speed during fan speed control operation, and when synchronous control of multiple fans and constant fan speed are required, the fan control scheme becomes complicated. For this reason, the demand for intelligent fans with control boards is gradually increasing. The motherboard can directly send commands for the required functions, such as constant speed, constant temperature, PWM duty, stop, or forward/reverse, to the intelligent fan via a communication interface, and the intelligent fan can self-adjust a fan status thereof according to the system requirements.

The motherboard can also obtain the current information of the fan operation through the communication interface, for example, the information can include an instant rotation speed, power consumption, or an abnormal condition. Therefore, the motherboard can obtain a characteristic curve, a production traceability and a lifespan of the intelligent fan.

The conventional intelligent fan usually uses a four-wire fan provided with a PWM communication interface or an I2C communication interface. Each of the fan with the PWM communication interface and the fan with the I2C communication interface has four pins, but these two fans are very different. If the user does not know the interface format of the fan on the existing motherboard, the interface incompatibility problem may occur when the user replaces the fan. In other words, when the conventional fan (such as the PWM fan) is installed with the new communication interface (such as I2C interface) on the motherboard or the new fan (such as the I2C fan) is installed with the conventional communication interface (such as PWM interface) on the motherboard, the compatibility problem occurs.

Therefore, how to develop an intelligent fan with interface compatibility, to enable the intelligent fan to be compatible with the PWM input and the I2C input of the motherboard, is a key issue for the intelligent fan manufacturer.

SUMMARY OF THE INVENTION

An objective of the present invention is to provide an intelligent fan with interface compatibility which is compatible with different input interfaces of the motherboard, so that the intelligent fan with interface compatibility of the present invention is compatible with new motherboard and also downwardly compatible with conventional motherboard system, thereby achieving the technical effect of easy fan replacement by using the same intelligent fan.

According to an embodiment, the present invention provides an intelligent fan with interface compatibility, and the intelligent fan includes a fan body, a driving circuit, a tachometer, an output connector and a microcontroller. The fan body includes a fan and a motor. The driving circuit is connected to the motor, and configured to receive a control signal to drive the motor to rotate, so as to drive the fan. The tachometer is configured to detect a rotation speed of the motor. The output connector includes a first pin, a second pin, a third pin and a fourth pin, and is connected to a fan connector of a motherboard. The microcontroller is connected to the driving circuit and the tachometer, and is connected to the motherboard via the first pin, the second pin, the third pin and the fourth pin. When the intelligent fan is powered on, the microcontroller sets the third pin and the fourth pin as input pins configured to receive an output signal of the fan connector of the motherboard, and the microcontroller performs an I2C signal analysis on the output signal, and when the I2C signal analysis succeeds, the microcontroller sets the intelligent fan in an I2C mode, and when the I2C signal analysis fails, the microcontroller sets the intelligent fan in a PWM mode. When the intelligent fan is set in the I2C mode, the third pin and the fourth pin are set as input pins configured to receive an I2C signal, and when the intelligent fan is set in the PWM mode, the third pin is set as an output pin to output a fan speed value, and the fourth pin is set as an input pin configured to receive a PWM control signal.

According to an embodiment, the present invention provides a controlling device of an intelligent fan with interface compatibility. The controlling device can be applied to a fan body comprising a fan and a motor, and the controlling device includes a driving circuit, a tachometer, an output connector and a microcontroller. The driving circuit is connected to the motor and configured to receive a control signal to drive the motor to rotate, so as to drive the fan. The tachometer is configured to detect a rotation speed of the motor. The output connector includes a first pin, a second pin, a third pin and a fourth pin, and is connected to a fan connector of a motherboard. The microcontroller is connected to the driving circuit and the tachometer, and is connected to the motherboard via the first pin, the second pin, the third pin and the fourth pin. When the intelligent fan is powered on, the microcontroller sets the third pin and the fourth pin as input pins configured to receive an output signal of the fan connector of the motherboard, and the microcontroller performs an I2C signal analysis on the output signal, and when the I2C signal analysis succeeds, the microcontroller sets the intelligent fan in an I2C mode, and when the I2C signal analysis fails, the microcontroller sets the intelligent fan in a PWM mode. When the intelligent fan is set in the I2C mode, the third pin and the fourth pin are set as input pins configured to receive an I2C signal, and when the intelligent fan is set in the PWM mode, the third pin is set as an output pin configured to output a fan speed value, and the fourth pin is set as an input pin configured to receive a PWM control signal.

According to an embodiment, the present invention provides a controlling device of an intelligent fan with interface compatibility, and the controlling device can be applied to a fan body including a fan and a motor, and the motor is connected to a driving circuit, and the driving circuit can receive a control signal to drive the motor to rotate, so as to drive the fan, and the motor is connected to a tachometer which detects a rotation speed of the motor. The controlling device includes an output connector and a microcontroller. The output connector includes a first pin, a second pin, a third pin and a fourth pin, and connected to the fan connector of the motherboard. The microcontroller is connected to the driving circuit and the tachometer, and is connected to the motherboard via the first pin, the second pin, the third pin and the fourth pin. When the intelligent fan is powered on, the microcontroller sets the third pin and the fourth pin as input pins configured to receive the output signal of the fan connector of the motherboard, and the microcontroller performs the I2C signal analysis on the output signal, and when the I2C signal analysis succeeds, the microcontroller sets the intelligent fan in the I2C mode, and when the I2C signal analysis fails, the microcontroller sets the intelligent fan in the PWM mode. When the intelligent fan is set in the I2C mode, the third pin and the fourth pin are set as input pins for receiving the I2C signal, and when the intelligent fan is set in the PWM mode, the third pin is set as an output pin for outputting a fan speed value, and the fourth pin is set as an input pin for receiving the PWM control signal.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1A:
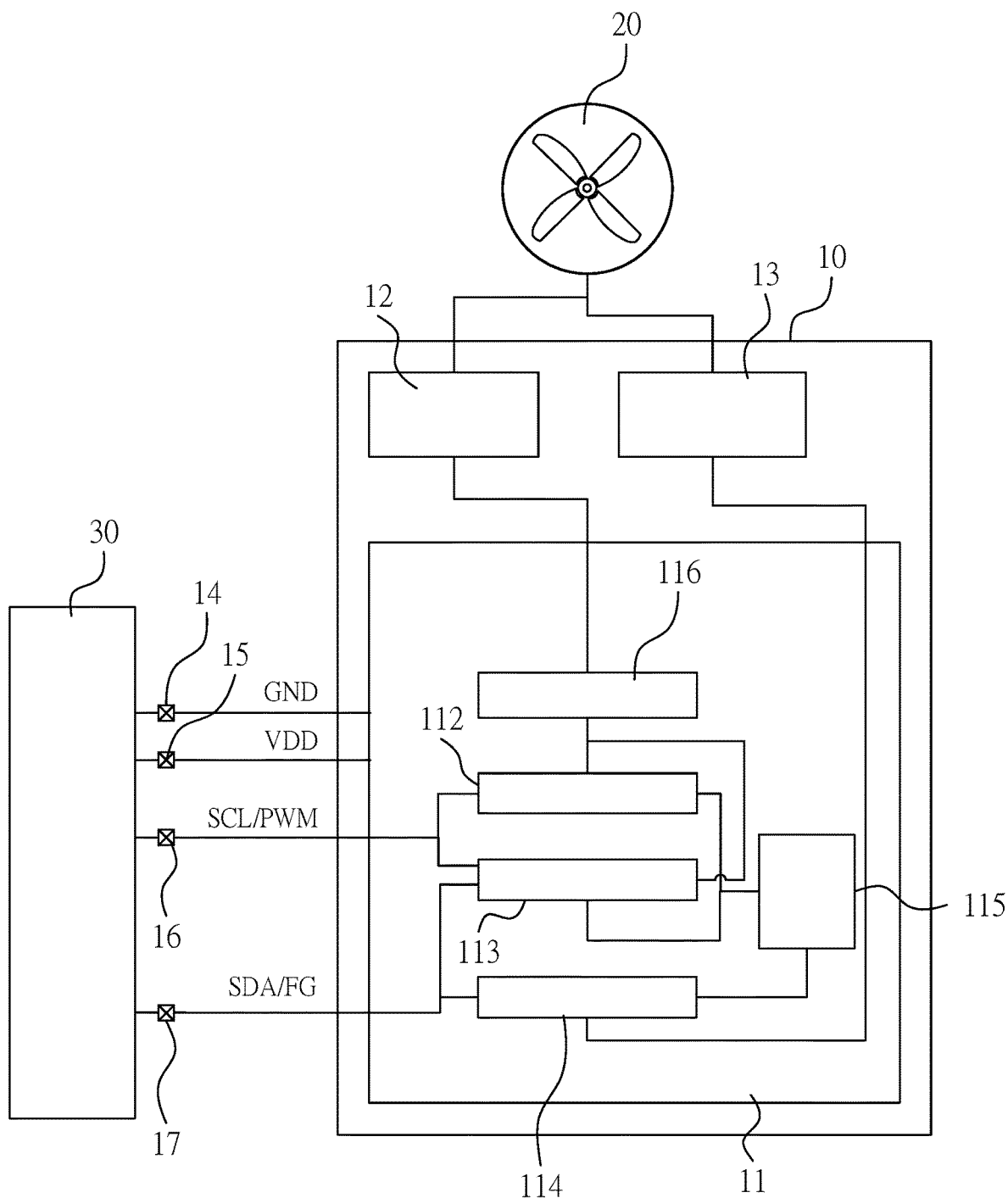
FIG. 1A is a functional block diagram of an intelligent fan with interface compatibility, according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

According an embodiment, the present invention can detect a type of a signal on the corresponding pin of a fan connector of a motherboard, to determine a signal output mode of the fan connector of the motherboard, so as to determine whether the control signal of the fan of the motherboard is in a PWM mode or an I2C mode, so that the intelligent fan of the present invention can be set in the PWM mode or the I2C mode, to achieve the technical effect of being downwardly compatible with different type of motherboard.

Please refer to FIG. 1A, which is a functional block diagram of an intelligent fan with interface compatibility of a first particular embodiment of the present invention. As shown in FIG. 1A, the intelligent fan includes a fan body 20, a driving circuit 12, a tachometer 13, a microcontroller 11, and an output connector having a first pin 14, a second pin 15, a fourth pin 16 and a third pin 17. The driving circuit 12, the tachometer 13, the output connector and the microcontroller 11 can be regarded as the controlling device 10 of the intelligent fan with interface compatibility of the present invention. The fan body 20 includes a fan and a motor. The driving circuit 12 is connected to the motor and configured to receive a control signal to drive the motor to rotate, so as to drive the fan. The tachometer 13 can detect a rotation speed of the motor. The output connector is connected to a fan connector of the motherboard 30. The microcontroller 11 is connected to the driving circuit 12, the tachometer 13, and is also connected to the motherboard 30 via the first pin 14, the second pin 15, the fourth pin 16 and the third pin 17. The first pin 14, the second pin 15, the fourth pin 16 and the third pin 17 are defined as GND, VDD, SCL/PWM and SDA/FG, respectively.

After the intelligent fan is powered on, the microcontroller 11 sets the fourth pin 16 and the third pin 17 as input pins configured to receive output signals of the fan connector of the motherboard 30, and the microcontroller 11 can perform the I2C signal analysis on the received signals. When the I2C signal analysis succeeds, the intelligent fan is set in the I2C mode. When the I2C signal analysis fails, the intelligent fan is set in the PWM mode. When the intelligent fan is set in the I2C mode, the fourth pin 16 and the third pin 17 are set as input pins for receiving the I2C signal. When the intelligent fan is set in the PWM mode, the fourth pin 16 is set as an input pin for receiving a PWM control signal, and the third pin 17 is set as an output pin for outputting a fan speed value.

The microcontroller 11 can include a PWM detection unit 112, an I2C unit 113, a PWM control unit 116, a mode selection unit 115, and an FG calculation unit 114 which is called as a rotation speed calculation unit. The FG calculation unit 114 is connected to the tachometer 13 and configured to receive the rotation speed of the tachometer 13, and calculate a speed value according to the rotation speed. The PWM detection unit 112 is connected to the fourth pin 16 (SCL/PWM) and configured to detect a PWM frequency of a signal on the fourth pin 16. The I2C unit 113 is connected to the fourth pin 16 (SCL/PWM) and the third pin 17 (SDA/FG), and configured to analyze the I2C signal inputted into the fourth pin 16 and the third pin 17. The PWM control unit 116 is connected to the PWM detection unit 112, the I2C unit 113 and the driving circuit 12, and configured to receive and convert the outputs of the PWM detection unit 112 and the I2C unit 113 into a control signal, and output the control signal to the driving circuit 12. The mode selection unit 115 is connected to the PWM detection unit 112, the I2C unit 113 and the FG calculation unit 114. After the intelligent fan is powered on, the mode selection unit 115 blocks the output of the FG calculation unit 114, and sets the intelligent fan in the PWM mode or the I2C mode according to the outputs of the PWM detection unit 112 and the I2C unit 113, and blocks the output of the FG calculation unit 114 in the I2C mode and enables the output of the FG calculation unit 114 in the PWM mode.

When the PWM detection unit 112 detects that the PWM frequency of the signal on the fourth pin 16 exists and the PWM frequency is lower than 50 KHz, the PWM detection unit 112 generates a PWM enable signal to the mode selection unit 115. The mode selection unit 115 sets the intelligent fan in the PWM mode according to the PWM enable signal.

When the I2C unit 113 can successfully analyze the I2C signal inputted into the third pin 17 and the fourth pin 16, the I2C unit 113 can generate an I2C enable signal to the mode selection unit 115, the mode selection unit 115 can set the intelligent fan in the I2C mode I2C enable signal.

Figure 1B:
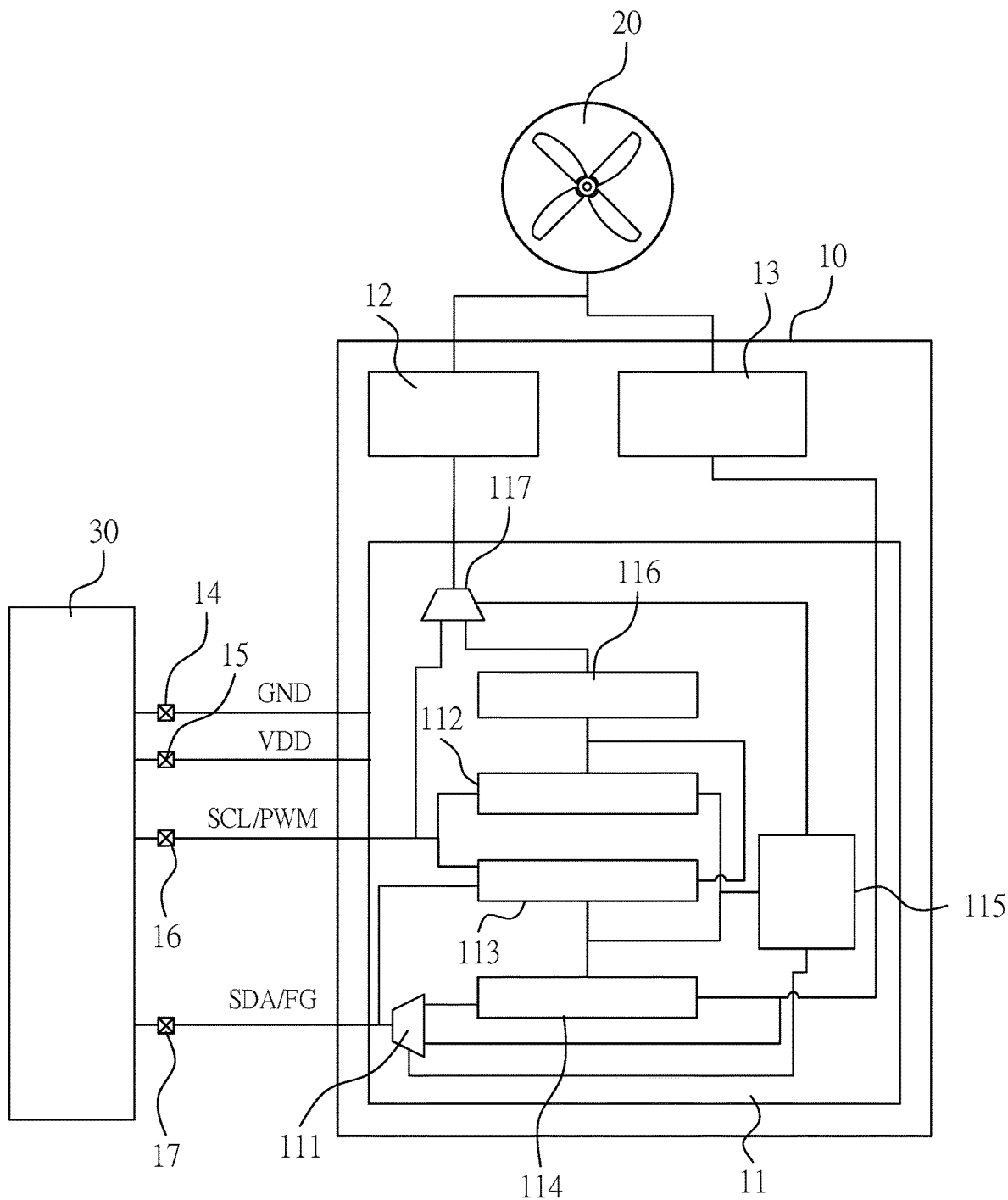
FIG. 1B is a functional block diagram of an intelligent fan with interface compatibility, according to another embodiment of the present invention.

Please refer to FIG. 1B, which is a functional block diagram of an intelligent fan with interface compatibility of another embodiment of the present invention. The difference between the embodiments of FIG. 1A and FIG. 1B is that the embodiment of FIG. 1B additionally includes a first multiplexer 111 and a second multiplexer 117. The first multiplexer 111 is disposed between the I2C unit 113 and the third pin 17, and connected to the FG calculation unit 114 and the tachometer 13. When the intelligent fan is set in the PWM mode, the mode selection unit 115 sets the first multiplexer 111 to directly connect the tachometer 13 and the third pin 17. The second multiplexer 117 is disposed between the PWM control unit 116 and the driving circuit 12 connected to the mode selection unit 115 and the fourth pin 16. When the intelligent fan is set in the PWM mode, the mode selection unit 115 sets the second multiplexer 117 to directly connect the driving circuit 12 and the fourth pin 16.

In other words, according to different mode, the microcontroller of the intelligent fan of the present invention can generate the PWM control signal, and bypass the control interface to transmit the PWM control signal to the driving circuit 12; feedback scheme of rotation speed can also be implemented by the same manner.

According to the embodiment of the intelligent fan with interface compatibility of the present invention, the types of the fans and the number of slots can be standardized, the motherboard 30 can uniformly standardize the calculations of the rotation speeds of the fans, so as to prevent from an alarm of a rotational speed calculation error because of the replacement of different fan, such as a single-phase fan or a three-phase fan.

Figure 2A:
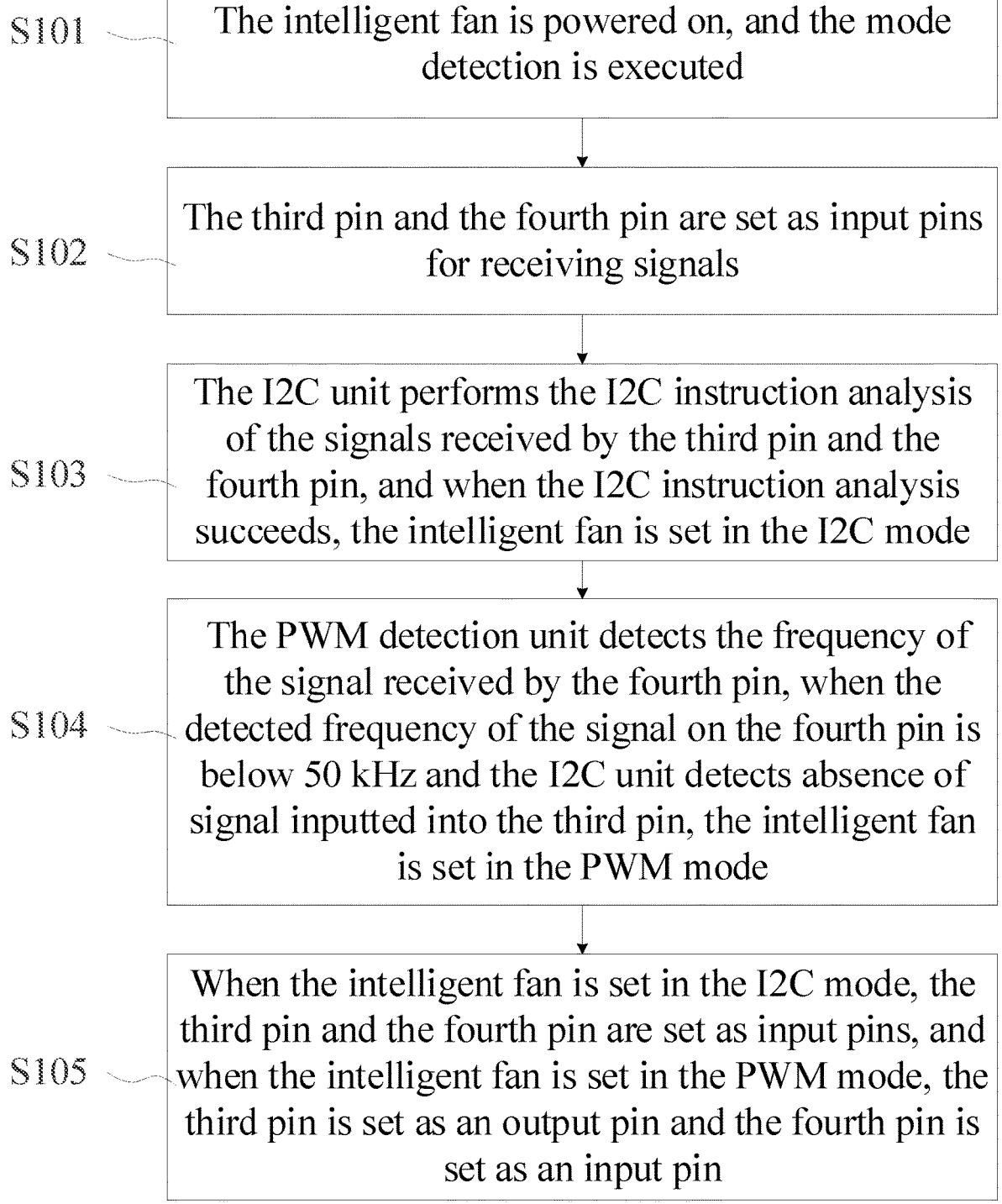
FIGS. 2A to 2C are flowcharts of interface determination methods of an intelligent fan with interface compatibility, according to three different embodiments of the present invention.
Figure 2B:
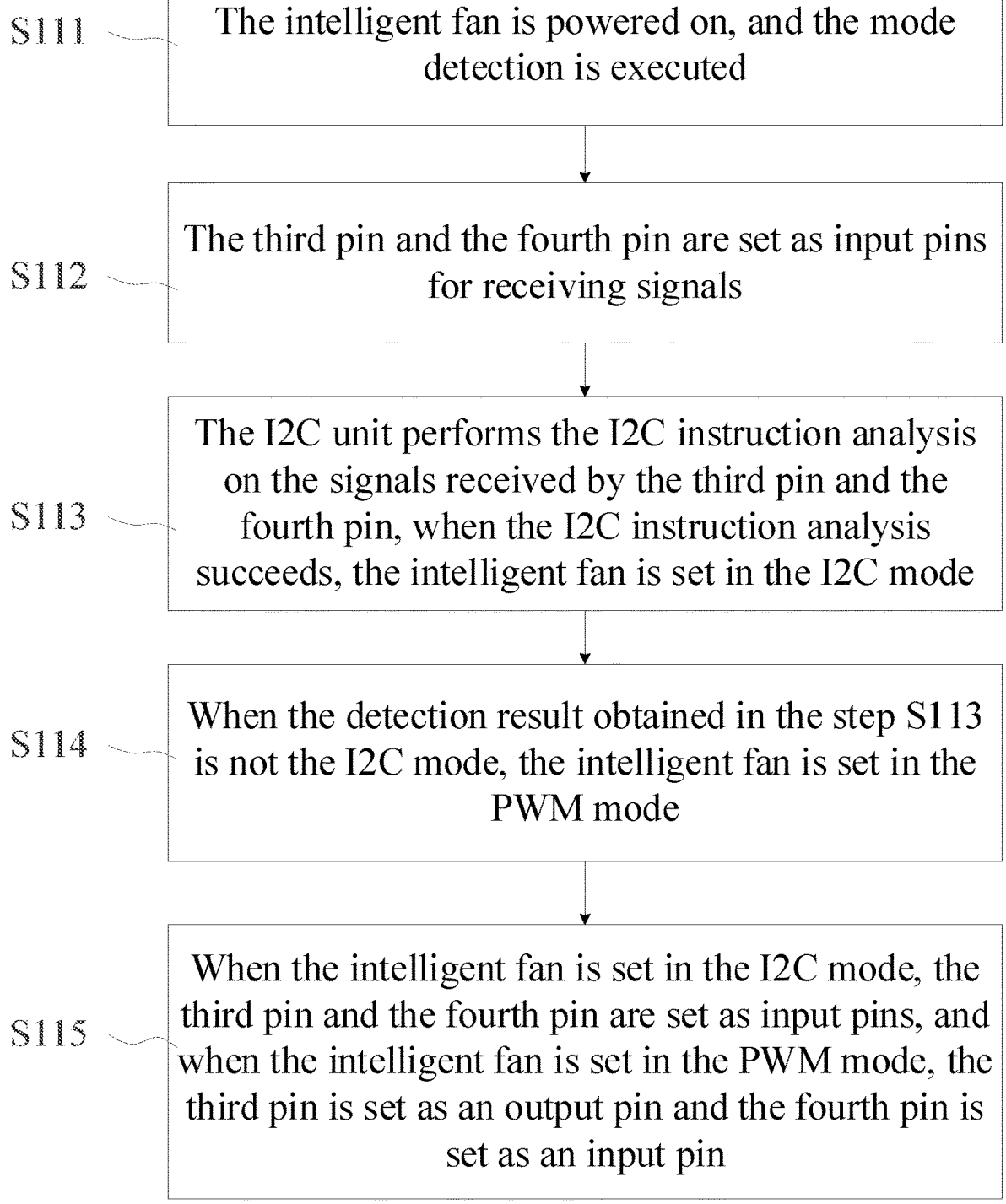
Figure 2C:
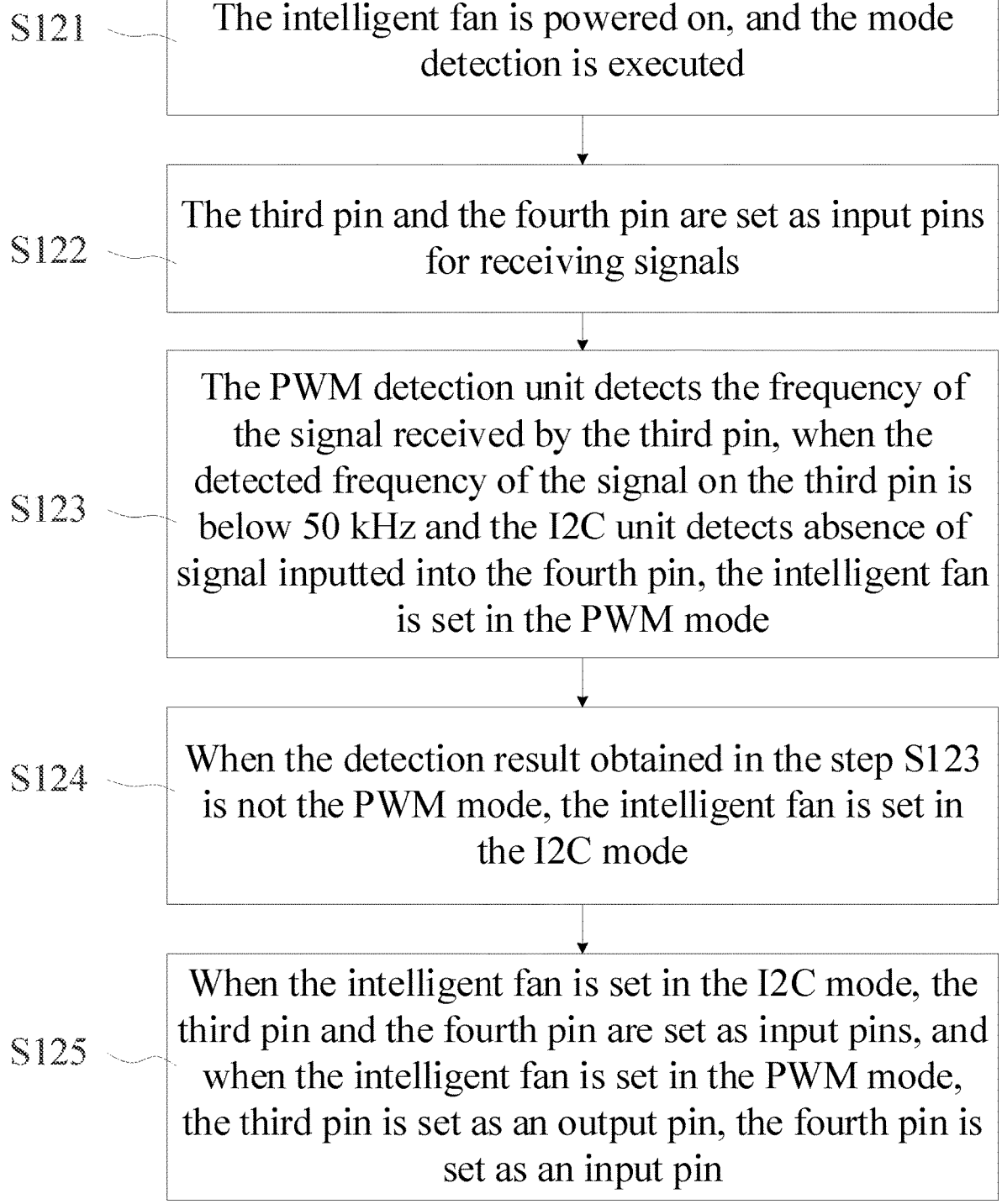

Please refer to FIGS. 2A to 2C, which show flowcharts of interface determination methods of the intelligent fan according to embodiments of the present invention. The interface determination methods of the intelligent are described with reference to FIG. 1A.

As shown in FIG. 2A, the interface determination method can include steps S101 to S105.

In a step S101, the intelligent fan is powered on, and the mode detection is executed.

In a step S102, the third pin and the fourth pin are set as input pins for receiving signals.

In a step S103, the I2C unit performs the I2C instruction analysis of the signals received by the third pin and the fourth pin, and when the I2C instruction analysis succeeds, the intelligent fan is set in the I2C mode.

In a step S104, the PWM detection unit detects the frequency of the signal received by the fourth pin, when the detected frequency of the signal on the fourth pin is below 50 kHz and the I2C unit detects absence of signal inputted into the third pin, the intelligent fan is set in the PWM mode.

In a step S105, when the intelligent fan is set in the I2C mode, the third pin and the fourth pin are set as input pins, and when the intelligent fan is set in the PWM mode, the third pin is set as an output pin and the fourth pin is set as an input pin.

As shown in FIG. 2B, the interface determination method can include steps S111 to S115.

In a step S111, the intelligent fan is powered on, and the mode detection is executed.

In a step S112, the third pin and the fourth pin are set as input pins for receiving signals.

In a step S113, the I2C unit performs the I2C instruction analysis on the signals received by the third pin and the fourth pin, when the I2C instruction analysis succeeds, the intelligent fan is set in the I2C mode.

In a step S114, when the detection result obtained in the step S113 is not the I2C mode, the intelligent fan is set in the PWM mode.

In a step S115, when the intelligent fan is set in the I2C mode, the third pin and the fourth pin are set as input pins, and when the intelligent fan is set in the PWM mode, the third pin is set as an output pin and the fourth pin is set as an input pin.

As shown in FIG. 2C, the interface determination method can include steps S121 to S125.

In a step S121, the intelligent fan is powered on, and the mode detection is executed.

In a step S122, the third pin and the fourth pin are set as input pins for receiving signals.

In a step S123, the PWM detection unit detects the frequency of the signal received by the third pin, when the detected frequency of the signal on the third pin is below 50 kHz and the I2C unit detects absence of signal inputted into the fourth pin, the intelligent fan is set in the PWM mode.

In a step S124, when the detection result obtained in the step S123 is not the PWM mode, the intelligent fan is set in the I2C mode.

In a step S125, when the intelligent fan is set in the I2C mode, the third pin and the fourth pin are set as input pins, and when the intelligent fan is set in the PWM mode, the third pin is set as an output pin, the fourth pin is set as an input pin.

For the pins of the motherboard 30, in the I2C mode, the pins of the motherboard 30 corresponding to the fourth pin 16 and the third pin 17 are set as output pins; and in the PWM mode, the pins of the motherboard 30 corresponding to the fourth pin 16 and the third pin 17 are set as an output pin and an input pin, respectively. For the intelligent fan of the present invention, in the I2C mode, the fourth pin 16 and the third pin 17 are set as input pins; and in the PWM mode, the fourth pin 16 of the intelligent fan is set as an input pin, and the third pin 17 is set as an output pin. In other words, when the intelligent fan of the present invention is set in the PWM mode, the third pin 17 is set as an output pin, so that the speed value calculated by the FG calculation unit 114 can be outputted to the motherboard 30 via the third pin 17.

According to above-mentioned contents, the embodiments of FIGS. 2A and 2C can use the I2C unit and the PWM detection unit to detect the third pin and the fourth pin, and the embodiment of FIG. 2B uses the I2C unit only to detect the third pin and the fourth pin. The difference between the embodiments of FIGS. 2A and 2C is that the embodiment of FIG. 2C first determines whether the intelligent fan is in the PWM mode. Preferably, the embodiments of FIGS. 2A to 2C can be executed by the architectures of the embodiments of FIGS. 1A and 1B.

Furthermore, the controlling device 10 of the intelligent fan of the present invention can include the output connector and the microcontroller 11 only.

According to above-mentioned contents, the intelligent fan with interface compatibility of the present invention can detect the signals on the pins to solve the fan compatibility problem caused by different outputs of four pins of new motherboard and the conventional motherboard, so as to greatly solve the fan replacement problem for the motherboard and the user. As a result, the intelligent fan of the present invention can reduce whole maintenance cost and achieve the ultimate goal of intelligent fan without using software and any calibration process.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An intelligent fan with interface compatibility, comprising:
   a fan body comprising a fan and a motor;
   a driving circuit connected to the motor, and configured to receive a control signal to drive the motor to rotate, so as to drive the fan;
   a tachometer configured to detect a rotation speed of the motor;
   an output connector comprising a first pin, a second pin, a third pin and a fourth pin, and connected to a fan connector of a motherboard; and
   a microcontroller connected to the driving circuit and the tachometer, and connected to the motherboard via the first pin, the second pin, the third pin and the fourth pin;
   wherein when the intelligent fan is powered on, the microcontroller sets the third pin and the fourth pin as input pins configured to receive an output signal of the fan connector of the motherboard, and the microcontroller performs an I2C signal analysis on the output signal, and when the I2C signal analysis succeeds, the microcontroller sets the intelligent fan in an I2C mode, and when the I2C signal analysis fails, the microcontroller sets the intelligent fan in a PWM mode;
   wherein when the intelligent fan is set in the I2C mode, the third pin and the fourth pin are set as input pins configured to receive the I2C signal, and when the intelligent fan is set in the PWM mode, the third pin is set as an output pin to output a fan speed value, and the fourth pin is set as an input pin configured to receive a PWM control signal;
   wherein the microcontroller comprises:
   a rotation speed calculation unit connected to the tachometer, and configured to receive the rotation speed of the tachometer, and calculate a speed value according to the rotation speed;
   a PWM detection unit connected to the fourth pin, and configured to detect a PWM frequency of a signal on the fourth pin;
   an I2C unit connected to the third pin and the fourth pin, and configured to analyze an I2C signal inputted into the third pin and the fourth pin;
   a PWM control unit connected to the PWM detection unit, the I2C unit and the driving circuit, and configured to receive and convert the outputs of the PWM detection unit and the I2C unit into the control signal, and output the control signal to the driving circuit; and
   a mode selection unit connected to the PWM detection unit, the I2C unit and the rotation speed calculation unit, wherein after the intelligent fan is powered on, the mode selection units blocks the output of the rotation speed calculation unit, and sets the intelligent fan in the PWM mode or the I2C mode according to the outputs of the PWM detection unit and the I2C unit, and blocks the output of the rotation speed calculation unit in the I2C mode and enables the output of the rotation speed calculation unit in the PWM mode.

2. The intelligent fan according to claim 1, wherein the microcontroller comprises:
   a first multiplexer disposed between the I2C unit and the fourth pin, and connected to the rotation speed calculation unit and the tachometer, wherein when the intelligent fan is set in the PWM mode, the mode selection unit sets the first multiplexer to directly connect the tachometer and the fourth pin; and
   a second multiplexer disposed between the PWM control unit and the driving circuit, and connected to the mode selection unit and the fourth pin, and wherein when the intelligent fan is set in the PWM mode, the mode selection unit sets the second multiplexer to directly connect the driving circuit and the fourth pin.

3. The intelligent fan according to claim 1, wherein when the PWM detection unit detects that the PWM frequency of the signal on the fourth pin exists and the PWM frequency is lower than 50 KHz, the PWM detection unit generates and outputs a PWM enable signal to the mode selection unit.

4. The intelligent fan according to claim 1, wherein when the I2C unit successfully analyzes the I2C signal inputted into the third pin and the fourth pin, the I2C unit generates and outputs an I2C enable signal to the mode selection unit.

5. A controlling device of an intelligent fan with interface compatibility, applied to a fan body comprising a fan and a motor, and the controlling device comprising:
   a driving circuit connected to the motor and configured to receive a control signal to drive the motor to rotate, so as to drive the fan;
   a tachometer configured to detect a rotation speed of the motor;
   an output connector comprising a first pin, a second pin, a third pin and a fourth pin, and connected to a fan connector of a motherboard; and
   a microcontroller connected to the driving circuit and the tachometer, and connected to the motherboard via the first pin, the second pin, the third pin and the fourth pin,
   wherein when the intelligent fan is powered on, the microcontroller sets the third pin and the fourth pin as input pins configured to receive an output signal of the fan connector of the motherboard, and the microcontroller performs an I2C signal analysis on the output signal, and when the I2C signal analysis succeeds, the microcontroller sets the intelligent fan in an I2C mode, and when the I2C signal analysis fails, the microcontroller sets the intelligent fan in a PWM mode;

wherein when the intelligent fan is set in the I2C mode, the third pin and the fourth pin are set as input pins configured to receive the I2C signal, and when the intelligent fan is set in the PWM mode, the third pin is set as an output pin configured to output a fan speed value, and the fourth pin is set as an input pin configured to receive a PWM control signal;

wherein the microcontroller comprises:
  a rotation speed calculation unit connected to the tachometer and configured to receive the rotation speed of the tachometer, and calculate a speed value according to the rotation speed;
  a PWM detection unit connected to the third pin and configured to detect a PWM frequency of a signal on the third pin;
  an I2C unit connected to the third pin and the fourth pin, and configured to analyze an I2C signal inputted into the third pin and the fourth pin;
  a PWM control unit connected to the PWM detection unit, the I2C unit and the driving circuit, and configured to receive and convert the outputs of the PWM detection unit and the I2C unit into the control signal, and output the control signal to the driving circuit; and
  a mode selection unit connected to the PWM detection unit, the I2C unit and the rotation speed calculation unit, wherein after the intelligent fan is powered on, the mode selection unit blocks the output of the rotation speed calculation unit, and sets the intelligent fan in the PWM mode or the I2C mode according to the outputs of the PWM detection unit and the I2C unit, and blocks the output of the rotation speed calculation unit in the I2C mode and enables the output of the rotation speed calculation unit in the PWM mode.

6. The controlling device according to claim 5, wherein the microcontroller comprises:
  a first multiplexer disposed between the I2C unit and the fourth pin, and connected to the rotation speed calculation unit and the tachometer, wherein when the intelligent fan is set in the PWM mode, the mode selection unit sets the first multiplexer to directly connect the tachometer and the third pin; and
  a second multiplexer disposed between the PWM control unit and the driving circuit, and connected to the mode selection unit and the fourth pin, wherein when the intelligent fan is set in the PWM mode, the mode selection unit sets the second multiplexer to directly connect the driving circuit and the fourth pin.

7. The controlling device according to claim 5, wherein when the PWM detection unit detects that the PWM frequency of the signal on the third pin exists and the PWM frequency is lower than 50 KHz, the PWM detection unit generates and outputs a PWM enable signal to the mode selection unit.

8. The controlling device according to claim 5, wherein when the I2C unit successfully analyzes the I2C signal inputted into the third pin and the fourth pin, the I2C unit generates and outputs an I2C enable signal to the mode selection unit.

9. A controlling device of an intelligent fan with interface compatibility, applied to a fan body comprising a fan and a motor, wherein the motor is connected to a driving circuit, and the driving circuit is configured to receive a control signal to drive the motor to rotate, so as to drive the fan, and the motor is connected to a tachometer which detects a rotation speed of the motor, and the controlling device comprises:
  an output connector comprising a first pin, a second pin, a third pin and a fourth pin, and connected to the fan connector of the motherboard; and
  a microcontroller connected to the driving circuit and the tachometer, and connected to the motherboard via the first pin, the second pin, the third pin and the fourth pin;

wherein when the intelligent fan is powered on, the microcontroller sets the third pin and the fourth pin as input pins configured to receive an output signal of the fan connector of the motherboard, and the microcontroller performs an I2C signal analysis on the output signal, and when the I2C signal analysis succeeds, the microcontroller sets the intelligent fan in the I2C mode, and when the I2C signal analysis fails, the microcontroller sets the intelligent fan in the PWM mode;

wherein when the intelligent fan is set in the I2C mode, the third pin and the fourth pin are set as input pins configured to receive the I2C signal, and when the intelligent fan is set in the PWM mode, the third pin is set as an output pin configured to output a fan speed value, and the fourth pin is set as an input pin configured to receive a PWM control signal;

wherein the microcontroller comprises:
  a rotation speed calculation unit connected to the tachometer, and configured to receive the rotation speed of the tachometer and calculate a speed value according to the rotation speed;
  a PWM detection unit connected to the fourth pin, and configured to detect a PWM frequency of a signal on the fourth pin;
  an I2C unit connected to the third pin and the fourth pin, and configured to analyze the I2C signal inputted into the third pin and the fourth pin;
  a PWM control unit connected to the PWM detection unit, the I2C unit and the driving circuit, and configured to receive and convert the outputs of the PWM detection unit and the I2C unit into the control signal, and output the control signal to the driving circuit; and
  a mode selection unit connected to the PWM detection unit, the I2C unit and the rotation speed calculation unit, wherein when the intelligent fan is powered on, the mode selection unit blocks the output of the rotation speed calculation unit, and sets the intelligent fan in the PWM mode or the I2C mode according to the outputs of the PWM detection unit and the I2C unit, and blocks the output of the rotation speed calculation unit in the I2C mode and enables the output of the rotation speed calculation unit in the PWM mode.

10. The controlling device according to claim 9, wherein the microcontroller comprises:
  a first multiplexer disposed between the I2C unit and the fourth pin, and connected to the rotation speed calculation unit and the tachometer, wherein when the intelligent fan is set in the PWM mode, the mode selection unit sets the first multiplexer to directly connect the tachometer and the third pin; and a second multiplexer disposed between the PWM control unit and the driving circuit, and connected to the mode selection unit and the fourth pin, wherein when the intelligent fan is set in the PWM mode, the mode selection unit sets the second multiplexer to directly connect the driving circuit and the fourth pin.

11. The controlling device according to claim 9, wherein when the PWM detection unit detects that the PWM frequency of the signal on the third pin exists and the PWM frequency is lower than 50 KHz, the PWM detection unit generates and outputs a PWM enable signal to the mode selection unit.

12. The controlling device according to claim 9, wherein when the I2C unit successfully analyzes the I2C signal inputted into the third pin and the fourth pin, the I2C unit generates and outputs an I2C enable signal to the mode selection unit.

* * * * *